United States Patent
Murphy

(10) Patent No.: US 7,255,308 B1
(45) Date of Patent: Aug. 14, 2007

(54) SOLAR DOMINATED SATELLITE CONSTELLATIONS CAPABLE OF HAVING REPEATING COMMON GROUND TRACKS

(75) Inventor: John H. Murphy, Ellicott City, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 198 days.

(21) Appl. No.: 11/086,754

(22) Filed: Mar. 23, 2005

Related U.S. Application Data

(60) Provisional application No. 60/555,296, filed on Mar. 23, 2004, provisional application No. 60/555,295, filed on Mar. 23, 2004.

(51) Int. Cl.
 *B64G 1/10* (2006.01)
(52) U.S. Cl. .................................. 244/158.4
(58) Field of Classification Search ............. 244/158.4; 455/12.1, 13.1, 427; 250/334, 201.5; 342/352
See application file for complete search history.

(56) References Cited

U.S. PATENT DOCUMENTS

| | | | | |
|---|---|---|---|---|
| 3,243,706 A | * | 3/1966 | Grisham | 244/158.4 |
| 3,497,807 A | * | 2/1970 | Newton | 455/13.1 |
| 5,379,065 A | * | 1/1995 | Cutts | 348/269 |
| 5,420,789 A | * | 5/1995 | Fulton | 250/334 |
| 5,551,624 A | * | 9/1996 | Horstein et al. | 455/12.1 |
| 5,906,337 A | | 5/1999 | Williams et al. | |
| 5,971,324 A | | 10/1999 | Williams et al. | |
| 6,102,335 A | * | 8/2000 | Castiel et al. | 244/158.4 |
| 6,198,907 B1 | | 3/2001 | Torkington et al. | |
| 6,317,583 B1 | * | 11/2001 | Wolcott et al. | 455/12.1 |
| 6,479,808 B1 | * | 11/2002 | Schwemmer | 250/201.5 |
| 6,502,790 B1 | | 1/2003 | Murphy | |
| 6,695,260 B2 | * | 2/2004 | Castiel et al. | 244/158.4 |
| 2002/0160710 A1 | * | 10/2002 | Castiel et al. | 455/12.1 |

* cited by examiner

*Primary Examiner*—Rob Swiatek
(74) *Attorney, Agent, or Firm*—Birch, Stewart, Kolasch & Birch, LLP

(57) ABSTRACT

A new method of constellation design based on combining repeating ground tracks with common ground tracks and/or sun-synchronous orbits is used for performing high-precision change detection imagery for longer periods of time while minimizing battery usage. By precisely prescribing the orbital parameters, sharpened change detection images may be taken without the need to process out blurring by any special image re-working software. The relationship between the orbital parameters of the satellites is precisely tuned to the earth's rotation rate for the altitude of the satellites. The unique set of earth orbits minimizes satellite battery requirement while optimizing the ability to perform coherent change detection (CCD).

28 Claims, 6 Drawing Sheets

Sun

SOLAR DOMINATED SATELLITE CONSTELLATIONS CAPABLE OF HAVING REPEATING COMMON GROUND TRACKS

CROSS REFERENCE TO RELATED APPLICATION

The present application claims the benefit of U.S. Provisional Patent Application No(s). 60/555,296 and 60/555,295, both filed on Mar. 23, 2004, the entire contents of both which are hereby incorporated by reference.

BACKGROUND OF THE INVENTION

1. Field of the Invention

This invention relates generally to satellite constellation designs and more particularly to repeating common ground track constellations which are capable of being sun-synchronous.

2. Description of Related Art

Most of today's satellite constellations have an earth-centric inertial (celestial or geocentric inertial [GCI]) design. In other words, GCI constellations designs are organized into planes having multiple satellites that are fixed in inertial space. The GCI coordinate system is the most common coordinate system for describing a single satellite orbiting the earth.

A popular example of an earth-centric inertial designed constellation is the "Walker" constellation, named after John Walker a pioneer in satellite constellation design. Walker constellations consists of circular orbits of symmetric groups of satellites, uniquely identified by five parameters: (1) altitude, (2) inclination, and the integer triplet T/P/F, where (3) T is the total number of satellites in the constellations, (4) P is the number of planes, and (5) F is the phasing between adjacent planes.

The problem with most earth-centric, inertial constellations of satellites, and especially the Walker constellations, is that they consist of optimal configurations for high-precision earth-imagery applications.

High-precision earth-imagery, such as the successive synthetic-aperture radar (SAR) change detection technology, the coherent change detection (CCD) technology, and the high-level Digital Terrain Elevation Data (DTED) mapping all require that the sensors onboard a satellite pass over an area to be imaged along the same path a multiple number of times. For instance, CCD even requires that two images to be perfectly registered at the pixel level.

Any satellite system designed to perform image collection, whether electro-optics (E/O) or radar based, can arguably detect slow moving objects by CCD. For example, during wartime and perhaps even during peacetime reconnaissance missions, high-precision imagery of a specified region, an area of interest, is often desired. However, the frequency of revisits to this particular target region must be maximized within a minimum period of time so as not to miss any pertinent data.

For instance, a conventional technique for detecting slow moving targets, which has been used by intelligence personnel for more than 50 years, is to search for changes in common images. Change detection, as this process might be referred, allows one to define slow moving targets by analyzing successive SAR or DTED or optical images. Also, areas where tunnels or underground bunkers are under construction have been located by comparing temporally displaced optical images.

However, most earth-centric inertial constellations fail to simultaneously exhibit both high revisit rates and movement along the same ground path. On the other hand, the most notable exceptions to this rule are the constellations known as geostationary satellite constellations, geosynchronous satellite constellations and the equatorial orbiting satellite constellations.

However, these exceptions either require that the satellites orbit at extremely high altitudes (near 35,786 km), the geostationary and geosynchrounous satellites for example, or limits coverage to a very narrow region near the equator, the equatorial orbiting satellites (inclination=0 degrees) for example. However, satellites with altitudes below 35,786 km or with inclinations other than 0 degrees have failed to exhibit high revisit rates for specific targets while showing movement along the same ground paths.

Another problem recognized is that satellite systems which have been used for reconnaissance have not been designed with the object of performing change detection imagery with minimal blurring and distortion.

As shown in FIG. 1, conventional satellite systems are generally organized into a single orbital plane, wherein such a plane is uniquely defined by (1) an inclination angle, i, relative to the earth's equator and (2) an angle of the Right Ascension of the Ascending Node, RAAN. Orbital parameters such as these are used to describe a satellite's orbit and a constellation's configuration. For example, the inclination, i, is a constant defining the angle at which the orbital plane intersects the equator. The RAAN defines an angle between a non-rotating celestial reference, i.e., the first point of Aries, and the line of nodes. The line of nodes is defined by a line formed using the intersection of an orbital plane and the plane of the equator. The line of nodes provides an orbit orientation. All satellites with common values for i and RAAN are said to be in the same orbital plane.

However, the problem with groups of satellites organized into the same orbital plane is that the ground tracks, i.e., the movement of beams across the surface of the earth or the path across the earth, are not common. For example, as described above, the Walker satellite constellation fails to have a common ground track for each of the satellites in the constellation.

Furthermore, as shown in FIG. 2, even when the satellites are organized into different planes, a common ground track is seldom achieved. For instance, the Walker constellation, which includes a globally symmetric collection of satellites, and is aimed at providing groups of satellites that are organized into planes having common values for inclination and the RAANs are equally spaced around the earth. However, such a Walker configuration is sub-optimal because of the restriction that the phasing parameter F must be an integer in the range of 0 and P−1, where P is the number of planes being used.

As previously pointed out, Walker orbits are the classical way for describing satellite orbital parameters. As further shown in FIG. 2, Walker constellations consist of a plurality of equally spaced circular orbits having the same orbital inclinations. The inclination angle, i, of all the orbital planes in a Walker constellation is relative to a reference plane, which is typically the equator of the earth.

In FIG. 2, the orbital planes in the Walker constellations all have an equal planar spacing, i.e., 360°/P, where P is equal to the number of orbital planes. In this way, all of the satellites are equally spaced along the respective orbital plane, e.g., orbital plane 1, by 360°P/T, where T is the number of satellites. The phasing difference between the satellites in adjacent planes 1 and 2 of FIG. 2, referenced against the equator, is 360° F./T, where again F is the phasing parameter, which consists of an integer, and T is the total number of satellites. With this Walker arrangement, the ground tracks of the collection of satellites are seldom common.

The above-noted uncommon ground tracks are clearly illustrated in FIG. 3. As shown in FIG. 3, the ground tracks for a 2/1/0 Walker orbit is illustrated. The phrase 2/1/0 represents 2 satellites in one plane with zero phasing. The orbital altitude that was selected in FIG. 3 was 10,349.56 km, because at this altitude the ground tracks of any satellite in the constellation will retrace itself only once in a 24-hour period. In other words, in this example, the same path, i.e., a common ground track, can not be followed by any other satellite in less than a 24-hour period.

Furthermore, observe that there are six distinct ground traces in FIG. 3. Three ground traces carved out by satellite 1 and three ground traces carved out by satellite 2. The selection of the altitude of 10,349 Km causes the satellite ground traces to close upon themselves after three revolutions around the earth. Ground traces close upon themselves when the ground tracks start to literally follow on top of the previous ground trace. The closure of the ground traces upon themselves in a finite number of orbits is not a requirement for constellation design, but was merely chosen here to simplify the analysis of ground traces.

In FIG. 3, the ground track for satellite 1 has three distinctive ground traces before the ground tracks start to repeat. Likewise, satellite 2 has three other distinctive ground traces before the ground tracks start to repeat. The selection of the altitude helps to determine when a ground track will close upon itself. Satellite 1 and satellite 2 fail to have a common ground track/path across the earth. At the 10,349.56 km altitude example, each ground track consists of 3 ground traces covering $2\pi$ radians (360°) of longitude.

When images from two different satellites are taken of a common region of the earth, combining these images to arrive at a detection image will produce blurring and distortion if the two satellites follow different ground tracks. One technique which has been used to remove such defects in the detection images is the morphing technique. For example, "morphing" is used to stretch and twist the images to compensate for the defects. However, even when morphing is performed, there still remain errors in the change detection image due to the fact that the images are of three-dimensional regions, not two-dimensional regions. The stretching and twisting of images by using the morphing technique will compensate for blurring and distortion of two-dimensional images but does not adequately compensate for three-dimensional images.

Yet still another problem associated with conventional satellite constellation designs is that satellites orbiting at low earth orbits (LEO) are typically eclipsed from the sun at least once per orbit. In other words, in most low earth orbits (LEO), the satellites are eclipsed from the sun on the order of 40 minutes out of the nominal 90-minute orbital period. This creates a problem because the radar on most satellites must operate independently of whether or not it is in the sunlight. This means that any solar array on the satellite must be augmented by energy storage batteries in order to maintain power.

Most LEO satellite systems are designed to operate only a small fraction of the orbit so that the total weight of the power system is minimized. Under this scenario, the solar array is designed to trickle charge the batteries throughout the time it is in the sunlight and the batteries are sized to provide the power to the radar. Since batteries are very heavy in comparison to the solar array, the optimal solution under this scenario is that a small fraction of the orbital period is used for radar operation while leaving a larger fraction of the orbital period for charging the batteries. For long operational time period requirements, the satellite power system favors drawing the power from the solar arrays versus from the batteries because, for the same energy storage requirements, batteries weigh far more than the solar arrays. This means, for typical satellite orbits the amount of time that one operates while eclipsed would have to be sacrificed. It is desirable for the radar in the satellites to operate all of the time, but weight concerns tend to limit the ability to achieve this goal.

What is needed is a satellite constellation that provides high-precision imagery and high-level DTED mapping of specified regions on the earth at high revisit rates within a specified period while being capable of minimizing satellite battery requirements.

SUMMARY OF THE INVENTION

An aspect of the present invention is to provide an approach for determining the orbital parameters for groups of satellites in repeating common ground track orbits that are fixated on common ground paths.

Furthermore, an aspect of the present invention is to provide a satellite constellation design that uses an earth-centric, earth-fixed (ECEF) coordinate system.

Still another aspect of the present invention is to provide a satellite constellation design for repeating common ground tracks with high revisit rates.

Further, an aspect of the present invention is to provide constellations having minimal numbers of ground traces for particular combinations of altitudes and inclinations.

Furthermore, an aspect of the present invention is to define a set of orbits to provide a coherent change detection optimized satellite with minimal battery requirements.

These and other aspects are achieved by space-based constellation of satellites for providing continuous worldwide or regional coverage for applications including, but not limited to, high-precision change detection imaging by successive satellites in orbit around the earth in the detection of underground facilities activities and moving objects, for example.

Further scope of applicability of the present invention will become apparent from the detailed description provided hereinafter. It should be understood, however, that the detailed description and specific embodiments, while disclosing the preferred embodiments of the invention, are being provided by way of illustration only, since various changes and modifications coming within the spirit and scope of the invention will become apparent to those skilled in the art from the following detailed description.

BRIEF DESCRIPTION OF THE DRAWINGS

The present invention will become more fully understood when the accompanying drawings are considered together with the detailed description provided hereinafter and which are provided by way of illustration only, and thus are not meant to be limitative of the invention, and wherein.

DETAILED DESCRIPTION OF PREFERRED EMBODIMENTS

Figure 1:
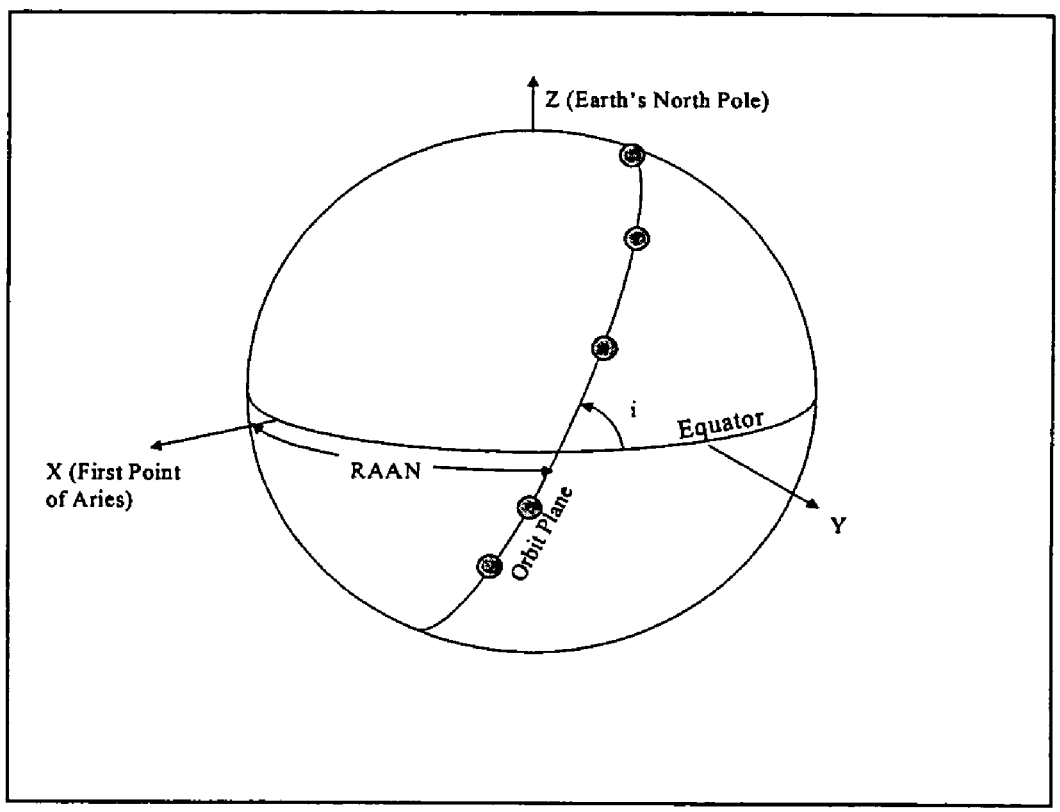
FIG. 1 is illustrative of a conventional orbital plane.

For a general understanding of the features of the present invention, reference is made to the drawings, wherein like reference numerals have been used throughout to identify identical or similar elements. While the present invention will be described in terms of an illustrative embodiment or embodiments, it will be understood that the invention is adaptable to a variety of constellation design techniques, such that the present invention is not necessarily limited to the particular embodiment or embodiments shown and described herein. To the contrary, the following description is intended to cover all alternatives, modification, and equivalents, as may be included within the spirit and scope of the invention.

In accordance with the present invention, spaced based change detection techniques are enhanced by a new approach to satellite constellation design based on repeating common ground tracks/paths. These novel constellation designs may even include total satellite counts that are as good as and more often are fewer than prior art constellations.

Such constellations as defined herein combine the concepts of common ground tracks with repeating ground tracks to arrive at a satellite constellation that is organized along common ground tracks that repeat after minimal number of orbits. With such a repeating common ground track constellation we have the added benefit of being able to perform high-precision change detection imagery for longer periods of time. Such high-precision change detection imaging by successive satellites following such a repeating common ground track around the earth is particularly useful in the detection of underground facilities activities and the detection of moving objects.

Furthermore, the repeating common ground track constellation as introduced above may further be combined with the concept of a sun-synchronous orbit whereby the satellite can operate in the sunlight substantially all of the time, thus minimizing battery requirements.

The high-precision imagery that can be captured via the satellites may be obtained by using any number of change detection means typically used in satellite technology. Such change detection means may include SAR, optical, UV, infrared or other imaging systems or combinations thereof.

The satellite constellations as provided herein may also be launched into orbit by any of numerous conventional launch vehicles capable of doing the same. Each individual satellite in the constellation may be launched from a different launch vehicle or the satellites may all be launched from the same launch vehicle or any combination thereof. By whichever means the satellite reach their orbit, once in orbit, such satellite constellations may be provided with conventional station-keeping arrangements to ensure that they follow the desired repeating common ground tracks/paths.

Station-keeping as mentioned herein includes minor orbital adjustments that are conducted to maintain the satellite's orbital assignment within the allocated "box". Station keeping is almost always required in order to minimize the amount of drifting typically encountered by satellites due in part to the elliptical shape of the earth. This drifting of the satellites is generally a non-linear effect. Station keeping of the herein described new constellation designs helps to ensure the repeating common ground tracks/paths, whether sun-synchronous or not.

In relationship to the sun-synchronous concepts, the present invention describes a unique set of earth orbits that minimizes satellite battery requirements while optimizing the ability to maximally perform coherent change detection for longer durations. For example, sun-synchronous orbits that are situated close to the terminator of the earth can ideally operate in the sunlight most of the time, minimizing the need to rely on the battery because of the use of the solar arrays, for example.

Figure 4:
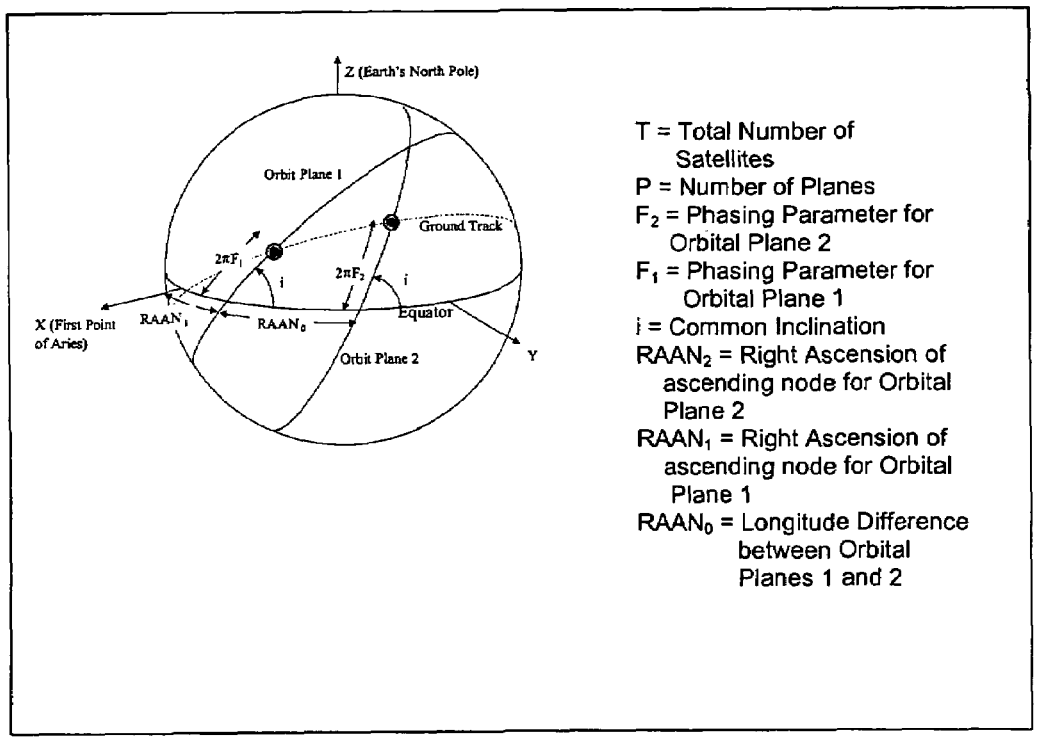
FIG. 4 illustrates orbit definitions for repeating common ground track constellations in accordance with a preferred embodiment of the present invention.

In accordance with a preferred embodiment of the present invention, FIG. 4 illustrates an analytical approach to achieving an exemplary repeating common ground track constellation configuration. For the purpose of illustration, the analysis shown herein is done for the most part for a spherical earth. However, in practice, the results should be perturbed to account for effects such as the earth's oblateness, the precession of the orbits of the satellite due to such effects, and the precession of the earth due to the gravitational effects of the moon, sun, and other celestial bodies. (In fact, the altitudes selected for illustrating the novel approach will take these effects into account and results will show orbits with integer numbers of traces in a 24-hour period.) In the sections to follow, all of these effects are taken into account to develop a practical preferred embodiment to this invention.

For example, FIG. 4 illustrates a general configuration for a repeating common ground track constellation. Specifically, an exemplary approach to developing a repeating common ground track constellation is to change the coordinate systems typically used. This change in coordinate system will allow us to properly focus on how to organize the satellites in circular obits that are optimized for earth imagery applications. For instance, the earth-centric, inertial or GCI reference system used today is ideal for specifying a satellite's location in inertial space but does not allow one to fixate on the ground paths traced by the satellites.

However, the present constellations are designed with an earth-centric, earth-fixed (ECEF) coordinate system in mind because ECEF coordinates are ideal for evaluating regions on the earth by using imagery capabilities with regard to change detection imagery and high-level DTED mapping and also for enhancing the satellite's revisit rates.

For example, constellations of satellites that are of the ECEF designs are organized into common ground tracks/paths. Common ground track/path constellations are strikingly different from ordinary (GCI) constellations in that they are optimally arranged for imagery applications because they consist of multiple satellites that follow a common ground track.

Our analysis of the common ground track/path constellations as presented herein, as a function of the altitude and inclination of the orbiting satellites, has shown that these constellations have minimal numbers of ground traces for particular combinations of altitudes and inclinations. These minimal ground tracks/paths correspond to having multiple daily repeating ground tracks. Repeating in the sense that the ground track starts from the same location and substantially traces out the same path as a previous track. As such, not only does the successive satellites in the constellation follow the same/common ground path, but the rate of daily revisits for the entire string of satellites along this common path is enhanced by the repeating quality of the common ground paths. As noted above, this equates to having a minimal number of distinctive ground traces.

The repeating common ground track/path constellations in this disclosure at least: (1) maximizes the revisit rate to any desired area of interest within a 24-hour period; (2) have paths over any desired target area which is uniquely determined and independent of any other satellite in the constellation; and (3) can operate at altitudes that are less than geosynchronous orbits and have inclinations that can be set consistent with global coverage requirements. As such, the repeating common ground track/path constellations described herein can fully satisfy all of the constraints previously identified for a constellation that has been optimized for imagery applications.

FIG. 4 illustrates an analytical approach to defining the repeating common ground track/path constellations. As shown in FIG. 4, $RAAN_1$ represents the right ascension of ascending node for orbital plane 1; and $F_1$ represents the phasing parameter for orbital plane 1.

Figure 2:
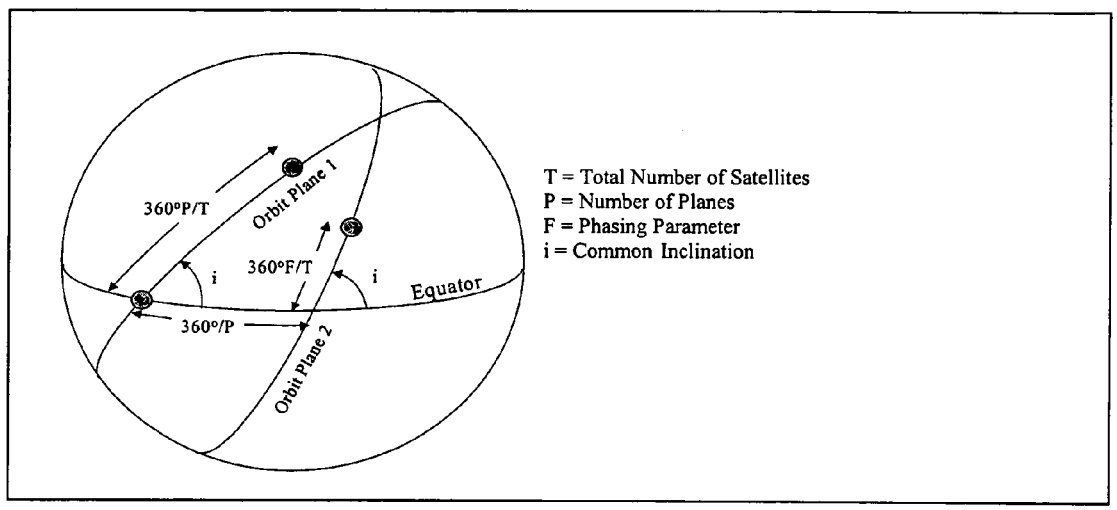
FIG. 2 is illustrative of a conventional Walker constellation.

In illustrating the beneficial arrangements presented by the present invention, an example involving two satellites orbiting in a common plane (See FIG. 2) is used. Since the ground tracks of these two satellites are different (see FIG. 3), images taken from one satellite could not be accurately combined with images taken from the other satellite to form a change detection image, without the need for performing some sort of image processing to remove distortion and blurring.

Figure 3:
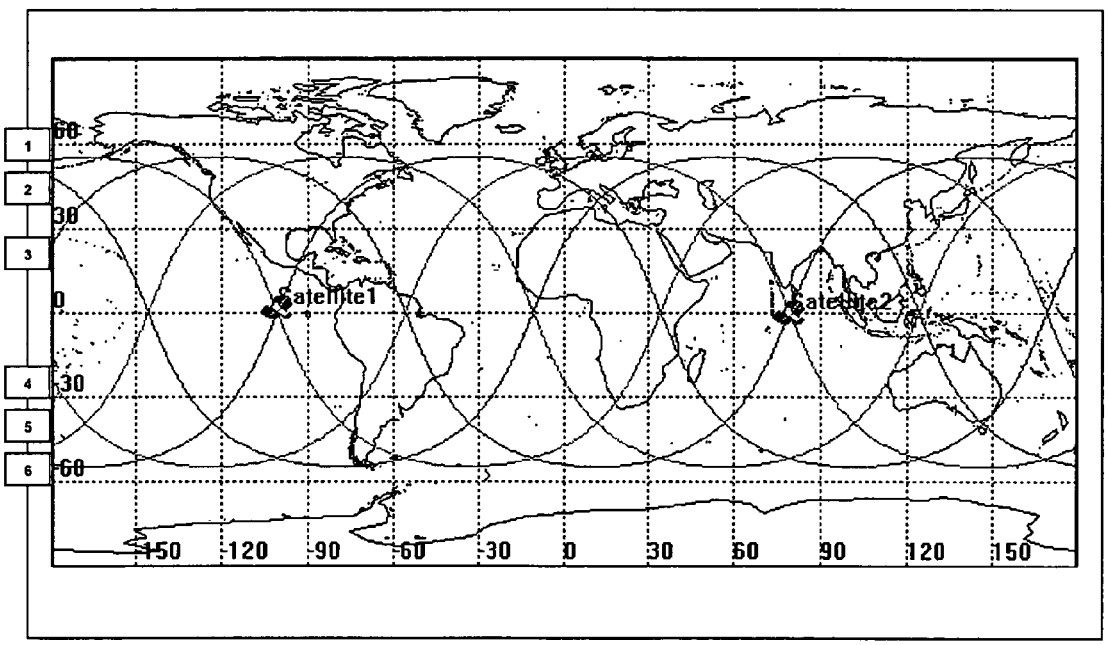
FIG. 3 illustrates ground tracks of a 2/1/0 constellation as defined in FIG. 2.
Figure 5:
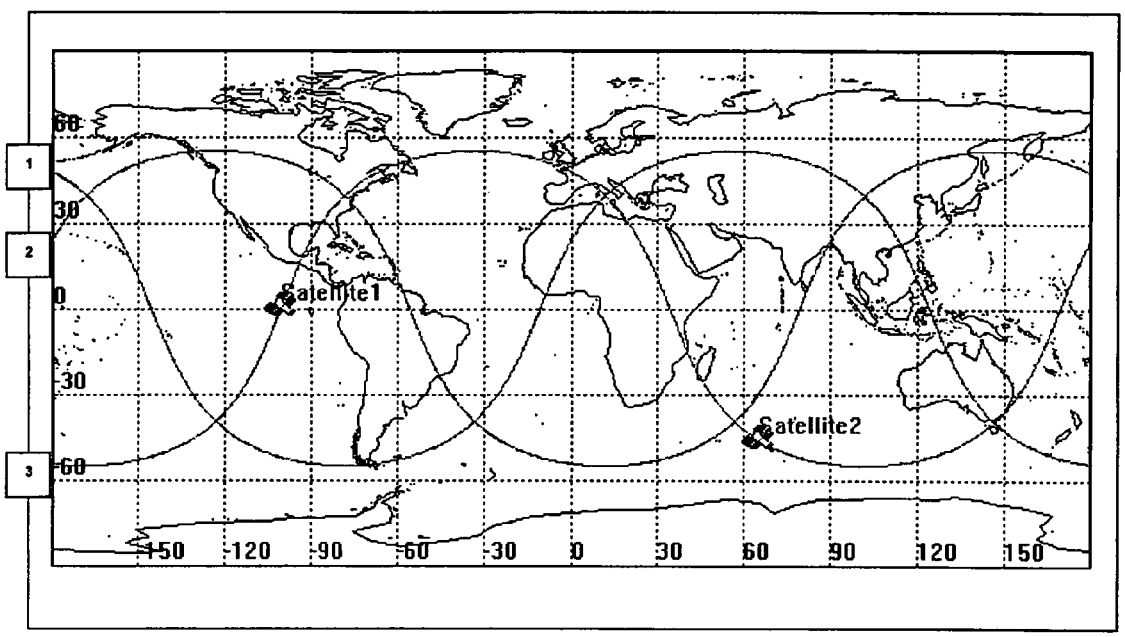
FIG. 5 illustrates two satellites following a common ground track in accordance with a preferred embodiment of the present invention.

FIG. 5 illustrates an example of a change detection orbit distinguishable from FIG. 3 in that it is designed according to the approaches presented in this disclosure. As shown in FIG. 5, the ground path of satellite 1 is the same ground path as shown in FIG. 3. However, unlike in FIG. 3, in FIG. 5 satellite 2 follows the same ground path as satellite 1. In this example, satellite 2 is placed in a different orbital plane from satellite 1. Furthermore, satellite 2 has a right ascension of the ascending node (RAAN) of 300 degrees relative to satellite 1, and the phasing angle between the two satellites is set at 240 degrees. The choice of values for RAAN and phasing are critical to achieving a common ground track for satellite 1 and satellite 2, as will be explained more fully below.

Notice in FIG. 5 that there are three distinct ground traces across the surface of the earth, which corresponds to the common ground track/path for satellite 1 and satellite 2. In other words, satellite 1 and satellite 2 will both follow track 1, then track 2, and then track 3, for example.

The change detection orbits shown in FIG. 5 no longer follow the Walker type orbits. Specifically, the two satellites here may have common inclinations, 55 degrees for example, yet the phasing between the satellites and the spacing between planes no longer conform to the Walker orbit definitions.

To make a common ground track constellation in this manner, the spacing and phasing between satellites are precisely adjusted to form a string of satellites traveling along a common ground track/path whereby the coverage regions overlap throughout the length of the tracking. Several such common ground tracks may be constructed and tiled such that there are no gaps in the coverage of the earth between two desired latitudes.

For example, for an ideal spherical model of the earth, if a satellite orbits at a radius "a" (in km), the number of repeating orbits $k_0$ will satisfy the following equation:

$$k_0 = 1/\omega_e(\mu/a^3)^{0.5} \tag{1}$$

where $$\mu = \text{Kepler's gravitational constant} = 3.986 \times 10^5 \text{ km}^3/\text{s}^2 \tag{2}$$

$$\omega_e = \text{Earth's rotation rate} = 7.292 \times 10^{-5} \text{ rad/s} \tag{3}$$

for integer and non-integer values of $k_0$. As such, the satellite will orbit this ideal earth exactly $k_0$ times in 24 hours. The satellite radius "a" is a combination of the earth's radius and the altitude of the satellite. Specifically, $a = R_e + h$, wherein $R_e$ = the radius of the earth and h = the altitude of the satellite.

Actually, the earth is oblate, not spherical, and a more precise model should be used which accounts for the oblateness of the earth. As such, for the oblate model of the earth, if a satellite orbits at a radius "a" (in km) then the following equation applies for k, the number of orbits in the repeating ground track:

$$k = \frac{k_0 \dot{L} + \dot{\omega} + \dot{M}}{\dot{L} - \dot{\Omega}} \tag{4}$$

where $$\dot{L} = 360 \text{ deg/day} = \text{Earth Rotation Rate} \tag{5}$$

$$\dot{\omega} k_2 a^{-7/2}(5 \cos^2 i - 1) = \text{Rate of Change of Perigee} \tag{6}$$

$$\dot{M} = k_2 a^{-7/2}(3 \cos^2 i - 1) = \text{Rate of Change of the Mean Anomaly} \tag{7}$$

$$\dot{\Omega} = -2k_2 a^{-7/2} \cos i = \text{Rate of Change of the Ascending Node} \tag{8}$$

and $$k_2 = 0.75 J_2 \mu^{1/2} R_e^2 = 1.029549648 \times 10^{14} \text{ deg-km}^{3.5}/\text{day} \tag{9}$$

$$R_e = 6378.14 \text{ km} = \text{Earth's Radius} \tag{10}$$

Again, we find that for integer values of k, the satellite will orbit the oblate earth exactly k times in 24 hours. Furthermore, the satellite ground tracks will start to repeat after a certain number of revolutions, forever tracing k−1 distinctive tracks across the oblate earth.

Constellations of satellites with common ground tracks/paths are characterized by the following relationships:

$$RAAN_2 = \text{mod}(RAAN_1 + RAAN_0, 2\pi) \tag{11}$$

$$2\pi F_2 = \text{mod}(2\pi F_1 - k \, RAAN_0, 2\pi) \tag{12}$$

As shown in FIG. 4, $RAAN_1$ represents (in radians) the right ascension of ascending node for orbital plane 1; $RAAN_2$ represents (in radians) the right ascension of ascending node for orbital plane 2 (not shown); $RAAN_0$ represents (in radians) the longitude difference between orbital planes 1 and 2; $F_1$ represents the phasing parameter for orbital plane 1; and $F_2$ represents the phasing parameter for orbital plane 2. The right ascension of the ascending node is the angle from the vernal equinox to the ascending node. The ascending node is the point where the satellite passes through the equatorial plane moving from south to north. Right ascension is measured as a right-handed rotation about the pole, Z.

All satellites, that have the same $RAAN_1$, $F_1$, and k that satisfies the above equations (4)-(12), will have a repeating common ground track. In other words, by starting with a predetermined value for $RAAN_1$, $F_1$ and the inclination, the displacement between two adjacent satellites (placed in different orbital planes) can be calculated wherein a repeating common ground track is achieved.

Generally, first the parameters for satellite 1 are designed, then the parameters for satellite 2 are calculated using modular arithmetic formulas (11) and (12). Formulas (11) and (12) rely on dividing the combination of the RAAN and the differential RAAN by 2π radians and looking for multiples of 2π radians, thereby achieving a repeating common ground track. Formulas (11) and (12) can also by expressed in terms of degrees wherein 2π radians could be replaced with 360°.

If it is desired that all satellites be equally spaced, then we could take 360° and divide that by the number of satellites to determine the spacing therebetween. However, any arbitrary spacing between the satellites can be derived. Furthermore, if an arbitrary (unequal) phasing is chosen, this will make it difficult to predict the passage of the next successive satellite, which is ideal for reconnaissance applications. In either case, satellite 1 and satellite 2 will follow the same repeating track on the ground. Satellite 2 will substantially follow right on top of the ground track of the previous orbit of satellite 1.

By precisely synchronizing any images taken from the successive satellites traveling along this repeating common ground track/path, very high precision (pixel-level and sub-pixel level) change detection images may be achieved when pixel-by-pixel differences are analyzed of the successive images. The precision of the change detection images is characterized by the timing and the frequency of synchronization aboard the two spacecraft/satellites.

Keep in mind that there is no absolute requirement that k be an integer. In fact, k can be a non-integer. The examples given herein use an integer value of k to merely simplify the illustrations.

In a preferred embodiment, predictions for the number of ground paths that may be traced around the earth before the ground paths start to repeat in a 24-hour period will be illustrated along with the corresponding altitudes for an oblate earth at two different inclinations. These predictions will be compared with the predictions for the number of repeating grounds paths within a 24-hour period that can be traced around the earth along with the corresponding altitudes for an ideal spherical earth at any inclination. By being able to predict the frequency of repeating ground paths and then combining this concept of repeating ground tracks (starting at the same point each time) with the concept of common ground tracks, constellations can be designed which exhibit a minimum number of distinctive ground traces.

In the present invention, we can preferably predict how many times a single satellite will orbit the earth within a 24-hour period, tracing out a determinable number of distinctive ground paths before it will start to repeat. In looking at this repeating aspect of a ground track, the number of distinctive ground tracks before a repeat happens can be predicted, hence designed, by adjusting the inclination and altitudes. Such predictions have been confirmed with the commercially available Satellite Tool Kit (STK).

As shown below in Table 1, an aspect of the invention is that minimal numbers of distinctive ground traces may be realized for particular combinations of altitudes and inclinations.

TABLE 1

| Earth Model Inclination No. of Distinctive Tracks Before repeat occurs | Ideal Spheriod Any | Oblate Spheroid 48.8 deg | Oblate Spheroid 28.5 deg |
| --- | --- | --- | --- |
| 0 | 35786.03 | 35786.10 | 35787.28 |
| 1 | 20183.62 | 20182.65 | 20184.16 |
| 2 | 13892.28 | 13889.58 | 13891.08 |
| 3 | 10354.72 | 10349.71 | 10350.96 |
| 4 | 8041.80 | 8033.98 | 8034.752 |
| 5 | 6391.42 | 6380.30 | 6380.418 |
| 6 | 5144.31 | 5129.45 | 5128.732 |
| 7 | 4162.90 | 4143.88 | 4142.162 |
| 8 | 3366.86 | 3343.26 | 3340.393 |
| 9 | 2705.86 | 2677.28 | 2673.109 |
| 10 | 2146.61 | 2112.67 | 2107.049 |
| 11 | 1666.18 | 1626.49 | 1619.266 |
| 12 | 1248.17 | 1202.35 | 1193.378 |
| 13 | 880.55 | 828.21 | 817.3412 |
| 14 | 554.25 | 495.01 | 482.0905 |
| 15 | 262.30 | 195.79 | 180.6563 |

As seen in table 1, there is a distinction between the altitude predictions for the ideal spherical model versus the oblate spheroid model of the earth. Thus, the model used to describe the earth will affect the predictions. Whichever model is used, general STK runs have verified the validity of the analytical approach for the oblate spheroid approximation of the earth, through verification of altitude (and inclination) predictions for a large number of repeating ground tracks.

Also verified, is the prediction that constellations with the afore-mentioned requirements can minimize the revisit time (i.e., the time it takes to return to a particular target on the earth).

For example, consider an ideal spheroid model of the earth with satellites orbiting at an altitude of approximately 9091.09 km. At this altitude, this model predicts that there will be approximately 3.5 distinctive ground tracks/traces in a 24-hour period. Keep in mind that when we are referring to repeating ground tracks/traces in Table 1, there is a difference of "1" between the number of distinctive ground traces and the number of orbits when a repeat track occurs.

For instance, for the 9091.09 km altitude, on the $4.5^{th}$ revolution around the earth the satellite will start repeating the ground traces. The "3.5" mentioned earlier represents the number of distinctive ground tracks/traces. If we were to double this value so as to arrive at a whole number (4.5+4.5=9), then it would take two days for the ground tracks to close on themselves. That is, in this example, it takes 9 (4.5+4.5) orbits before any given satellite retraces the path it takes over any given region.

Repeating this exercise for satellites orbiting at approximately 11,912.61 km, we have found that it will likely take 2 days or 7 distinctive ground paths, i.e., [(2.5+1)+(2.5+1)], to retrace any given ground path.

As we look at the altitudes near 10,354.72 km, we find that the time it takes to repeat a ground track is always greater than one day until we pick the altitude of exactly 10,354.72 km which yields a 1 day repeat rate corresponding to 4 orbits. This also demonstrates that the altitudes chosen for the one-day repeat rate yields the smallest number of ground traces across the earth. This is intuitively related to the fact that the earth rotates once per day.

Repeating ground track constellations have at least the following benefits. First, they are ideally suited for change detection imagery. Second, for any one satellite, the revisit time is exactly 24 hours. Third, for equally spaced satellites along the common ground track, the revisit time is 24/N hours where N is the number of satellites in the constellation. Fourth, the repeating ground tracks can be designed to operate at virtually any inclination, preferably from 0 to 90 degrees. Fifth, the coverage by the constellation can be along well-defined swaths. Sixth, where overlap between nearest neighbor satellites exists and along the swath it sweeps out, very high precision DTED imagery can be performed. Seventh, ground station coverage can be arranged so that only roll maneuvers of the ground station antennas need to be made as the satellites pass overhead. Eighth, the constellation ground swath can be located to cover known conflict areas optimally. Ninth, altitudes of operation below 35,876 km can be selected at 15 relatively unique locations. Tenth, the repeating ground track constellations require minimal station keeping requirements to continue to pass over the desired paths repeatedly. Eleventh, since the ground tracks never change after a certain number, repeating ground track constellations are good candidates for telecommunications systems. Twelfth, handoff between satellites in repeating ground track constellations is always to the same nearest neighbor along the ground track.

The above is not an exhaustive list of the benefits that repeating common ground track constellations offer. Other benefits exist. In fact, many superior attributes may be derived from repeating common ground track constellations, including the stationarity-like behavior derived from its use of an earth-centric, earth fixed frame of reference.

In yet another preferred embodiment of the present invention a unique set of repeating common ground track orbits can be further configured wherein the satellite battery requirements of the satellites are minimized.

For example, one solution to allowing the satellite to operate at a higher percentage of the orbital period while minimizing battery usage is to operate only while in the sunlight. For normal LEO orbits this dictates using a fairly large solar array and a minimal battery system. However, extending this design to operate while eclipsed from the sun requires that the solar array be twice as large as a solar array for a satellite that does not operate while eclipsed, in addition to a significantly heavier set of batteries. As such, this approach is highly undesirable.

As a result, in one preferred embodiment, the satellite orbits are preferably designed to be in the sunlight nearly all of the time. In other words, the orbits may be designed to remain near the terminator (twilight and dawn) throughout successive orbits. In essence, this is achieved by the proper selection of orbital altitudes, inclinations, and angle of right ascension.

For sun-synchronous types of orbits, the solar array is sized to directly power the radar wherein the radar may be operated all of the time. The resulting power system uses a minimal battery system as backup to power the satellite under abnormal conditions.

The first requirement that should be satisfied for such a sun-synchronous orbit is a repeating ground track requirement that is satisfied by adjusting the altitude and inclination by fulfilling the following equations:

$$h_o = \mu^{1/3}(2\pi j/D^* k_3)^{-2/3} - R_e \quad (13)$$

$$dL/dt = 360 \text{ deg/sidereal day} \quad (14)$$

$$d\Omega/dt = -2k_2 a^{-7/2} \cos i (1-e^2)^{-2} \quad (15)$$

$$d\omega/dt = k_2 a^{-7/2}(5 \cos^2 i - 1)(1-e^2)^{-2} \quad (16)$$

$$dM/dt = k_2 a^{-7/2}(3 \cos^2 i - 1)(1-e^2)^{-3/2} \quad (17)$$

$$n = (j/k_3)(dL/dt - d\Omega/dt) - (d\omega/dt + dM/dt) \quad (18)$$

$$h = \mu^{1/3}(n\pi/180)^{-2/3} - R_e \quad (19)$$

where,
$D^* = 86164.10035$ seconds/sidereal day,
$k_2 = 3/4 J_2 \mu^{1/2} R_e^2$ km$^{3.5}$/sidereal day,
$J_2 = 2^{nd}$ zonal harmonic coefficient $= 1.08261579 \times 10^{-3}$,
$\mu = 3.98600800 \times 10^5$ km$^3$/s$^2$,
$h_o$ = estimate for altitude,
$R_e$ = radius of the Earth,
j = number of orbits,
$k_3$ = number of days,
a = orbital radius,
i = inclination of orbit,
e = eccentricity of orbit,
L = rotation of the Earth,
$\Omega$ = RAAN,
$\omega$ = argument of periapsis,
M = mean anomaly,
n = angular motion, and
h = revised altitude.

The second requirement that should be satisfied for such a sun-synchronous orbit is the so-called sun-synchronous requirement. This sun-synchronous requirement is accomplished by simultaneously satisfying the following equations:

$$\Omega - \omega_0 = 0.9856 \text{ deg/day} \quad (20)$$

$$\Omega - \Omega_0 = d\omega/dt(t-t_0) \quad (21)$$

$$\Omega - \Omega_0 = -\frac{3}{2} J_2 \sqrt{\mu} R_e^2 a^{-7/2}(1-e^2)^{-2} \cos i (t-t_0) \quad (22)$$

which for a circular orbit, e=0, simplifies to $$i = \cos^{-1}(-4.77348 * 10^{-5} a^{7/2}) \quad (23)$$

where a=radius to the spacecraft, $\Omega_0$=RAAN of the orbital plane, t=current time at the satellite, and $t_0$=time that the satellite crosses the equatorial plane.

The altitude and the inclination are adjusted as dictated above so as to precisely match up the orbiting satellite with the earth's rotation relative to the sun.

Figure 6:
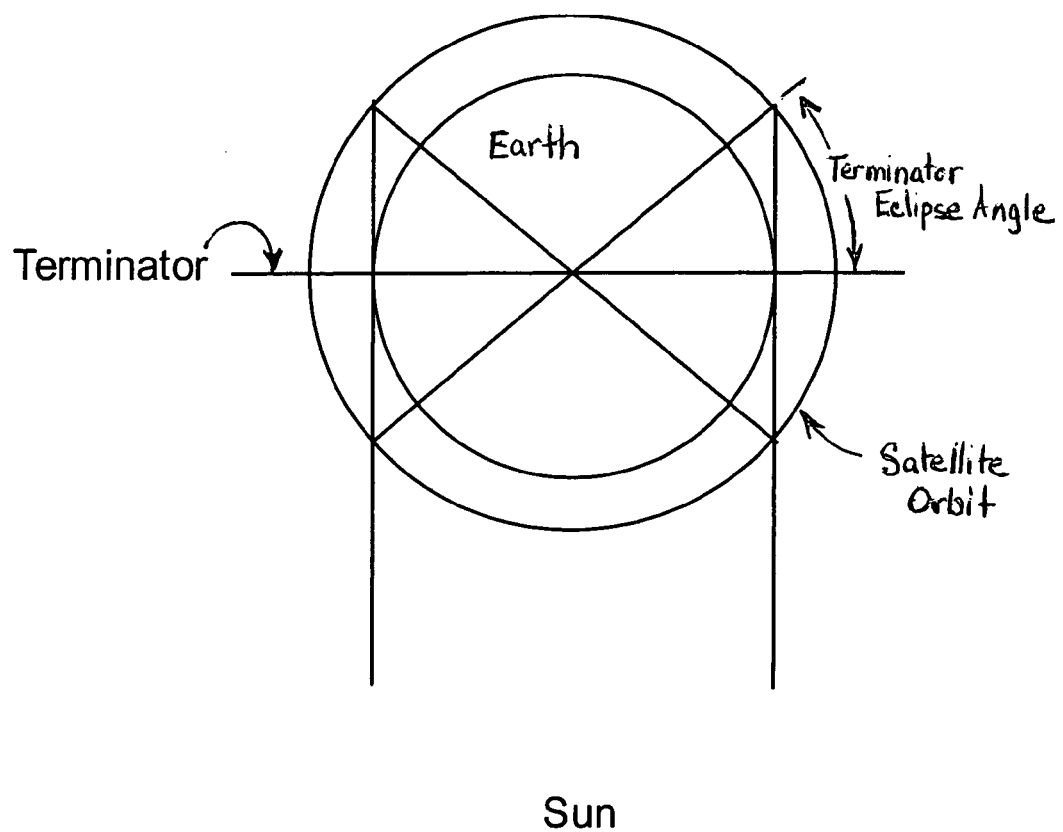
FIG. 6 illustrates the preferred location of the sun-synchronous satellite with respect to the terminator in accordance with a preferred embodiment of the present invention.

The desirability that the satellite orbit be in the sunlight at all times may be satisfied by carefully examining the location of the satellite with respect to the terminator, as shown in FIG. 6. Drifts in the orbits may occur due to the shape and rotation of the earth. However, with the proper selection of inclination, altitude, and angle of right ascension, along with appropriate station keeping, a sun-synchronous orbit may be achieved. For these types of orbits, the solar array is preferably sized to directly power the radar wherein the radar can be "ON" substantially all of the time. The resulting power system of the satellite can use a minimal battery system that is designed predominately to power the spacecraft when recovering from normal operating conditions as oppose to being needed for the majority of operations.

FIG. 6 also illustrates some limits to the orbital plane selection with respect to the terminator. Again, the proper selection of inclination and altitude, and placing the RAAN in the terminator region will help to ensure a sun-synchronous orbit. Additionally, in order to achieve the sun-synchronous orbits the satellites must be launched at the appropriate time, hence, launching during the launch window is critical.

Pulling all of this together, Table 2 below lists the preferred orbital characteristics for solar dominated (sun-synchronous) repeating ground tracks orbits.

of these orbits is on the order of 66%. On the other hand, this lower availability may be used to extend the useful life of the radar by turning off the radar while the satellite is over the polar regions.

Above the radiation belt, the $7^{th}$ and $8^{th}$ ground track MEO orbits shown in Table 2 are of secondary interest.

TABLE 2

| Indep Grd Tracks | Altitude km | Inclination degrees | Delta IV-M Useful Load kg | Terminator Eclipse Angle degrees | Inclination Visibility | Inclination Availability % | Seasonal Visibility | Seasonal Availability % | Total Availability % |
|---|---|---|---|---|---|---|---|---|---|
| 7  | 5171.037 | 142.209 | NA   | 56.48 | yes | 100.00% | no  | 78.6%  | 78.63%  |
| 8  | 4183.531 | 125.307 | NA   | 52.85 | yes | 100.00% | no  | 93.4%  | 93.38%  |
| 9  | 3383.598 | 116.022 | NA   | 49.20 | yes | 100.00% | no  | 99.6%  | 99.65%  |
| 10 | 2719.860 | 110.053 | NA   | 45.49 | yes | 100.00% | yes | 100.0% | 100.00% |
| 11 | 2158.554 | 105.925 | 5600 | 41.66 | yes | 100.00% | yes | 100.0% | 100.00% |
| 12 | 1676.479 | 102.936 | 6000 | 37.64 | yes | 100.00% | yes | 100.0% | 100.00% |
| 13 | 1257.107 | 100.700 | 6500 | 33.35 | yes | 100.00% | no  | 99.1%  | 99.05%  |
| 14 | 888.314  | 98.982  | 6900 | 28.63 | yes | 100.00% | no  | 95.7%  | 95.72%  |
| 15 | 560.986  | 97.635  | 7200 | 23.20 | yes | 100.00% | no  | 91.2%  | 91.18%  |
| 16 | 268.125  | 96.560  | 7400 | 16.33 | yes | 100.00% | no  | 84.7%  | 84.74%  |
| 17 | 4.264    | 95.690  | NA   | 2.09  | no  | 96.00%  | no  | 69.9%  | 67.10%  |

Listed in the first three columns are the number of repeating ground tracks, the altitude of the circular orbit, and the inclination of the orbital plane. Listed in column four are the useful loads that a Delta IV-M launch vehicle, for example, can carry for these orbital characteristics. Column five lists the extreme angle (+/−) that the orbital plane can make with respect to the terminator and still have the satellite in sunlight. Based on this information, column six tabulates whether the satellite is always in sunlight at the seasonal equinox condition and column seven list the approximate percentage of the time that the satellite is in the sunlight. Column eight tabulates whether the satellite is in the sunlight throughout a full year and column nine lists the approximate percentage of the time during the year that the satellite is in the sunlight. Finally, column ten combines these two availabilities to determine the overall availability.

Of particular interest are the rows representing the $13^{th}$ and $14^{th}$ ground track LEO orbits in Table 2. These orbits are well below the radiation belt and are hence good candidates for Space-based Radar (SBR) systems. The radiation belt consists of trapping regions of high-energy charged particles surrounding the earth. There is an inner belt and an outer belt. The inner one, located between about X=1.1–3.3 Re (Earth radii, geocentric) in the equatorial plane, contains primarily protons with energies exceeding 10 MeV. As a result of the offset between the earth's geographical and magnetic axes, the inner belt reaches a minimum altitude of about 250 km above the Atlantic Ocean off the Brazilian Coast. This South Atlantic Anomaly occupies a region through which low-orbiting (LEO) satellite frequently pass. Energetic particles in this region can be a source of problems for the satellites and astronauts.

The outer belt contains mainly electrons with energies up to 10 MeV. It is produced by injection and energization events following geomagnetic storms, which makes it much more dynamic than the inner belt (it is also subject to day-night variations).

The radiation belts are of importance primarily because of the harmful effects of the high energy particle radiation for man and electronics.

One concern with the $13^{th}$ and $14^{th}$ orbits is that the orbital inclination used will lead to about ⅓ of the orbit being used for covering the polar regions, therefore, the useful coverage These orbits do not cover the polar regions and therefore have a higher useful coverage on the order of 78% and 93%, respectively. However, these higher useful coverage come at two expenses: (1) less useful load may be carried by the launch vehicles due to the inclination of the orbits limiting the overall weight of the spacecraft, and (2) these orbits are not included in a totally benign radiation environment, which requires additional radiation shielding beyond that required for LEO orbits.

This invention describes a unique set of earth orbits that can minimize satellite battery requirements while optimizing the ability to perform coherent change detection imagery. These sun-synchronous satellite orbits, preferably located near the terminator, may substantially repeat the same ground tracks making them ideal for CCD while also minimizing the battery requirements.

In essence, this invention is a prescription for a constellation of satellites organized along repeating ground tracks/paths that may minimize satellite battery requirements while maximizing the ability to perform change detection imagery using multiple satellites. Such constellations may also include multiple satellites following the same/common ground track.

The above detailed description merely illustrates the principles of repeating ground track constellations and sun-synchronous constellations and their applicability to space based SAR change detection and CCD. Other embodiments, such as for optical, infrared, UV, and other imaging systems, are also feasible based on the principles of this invention and are considered to be within the spirit and scope of this disclosure.

This invention at least enables high precision (pixel level) change detection, differential SAR imagery and CCD. These type of imagery are very useful in detecting very slow moving objects and locating potential underground construction sites, a key reconnaissance activity for today's intelligence agencies.

Although preferred embodiments of the present invention have been described in detail herein, it should be understood that many variations and/or modifications of the inventive concepts herein taught still fall within the spirit and scope of the present invention.

What is claimed is:

1. A constellation of satellites having a repeating common ground track for providing change detection, comprising:

N satellites configured in a constellation for providing a minimal number of distinctive ground traces represented by k, where N is a integer ≧2, said N satellites being located in N orbital planes which are arbitrarily spaced around the earth, all of said N satellites trace common ground tracks which repeat at k+1 orbits, wherein k is a function of an altitude and an inclination of the N satellites, whereby for particular combinations of altitudes and inclinations a daily repeating common ground track is realized, wherein a right ascension of ascending node for orbital plane N ($RAAN_N$) and a phasing$_N$ for said N satellites are adjusted by multiples of 2π radians so as to have a ground track that is substantially overlapping the previous satellite's ground track.

2. The constellation of satellites as set forth in claim 1, wherein k is capable of being either an integer or a non-integer.

3. The constellation of satellites as set forth in claim 1, wherein the N orbital planes share a common inclination.

4. The constellation of satellites as set forth in claim 3, wherein the inclination can be any arbitrary number from 0 to πr/2 radians (0 to 90 degrees).

5. The constellation of satellites as set forth in claim 1, wherein the N satellites are capable of being asymmetrically spaced about the earth by adjusting a phasing therebetween unequally.

6. The constellation of satellites as set forth in claim 1, wherein said k is satisfied by the expression where $$k = \frac{k_0 \dot{L} + \dot{\omega} + \dot{M}}{\dot{L} - \dot{\Omega}}$$

where $\dot{L}$ Earth Rotation Rate $\dot{\omega}$=Rate of Change of Perigee $\dot{M}$=Rate of Change of the Mean Anomaly $\dot{\Omega}$=Rate of Change of the Ascending Node $k_0 = 1/\omega_e (\mu/a^3)^{0.5}$ where μ=Kepler's gravitational constant=3.986×10$^5$ km$^3$/s$^2$ $\omega_e$=Earth's rotation rate=7.292×10$^{-5}$ rad/s and a=radius of satellite in km.

7. The constellation of satellites as set forth in claim 1, wherein a revisit time for any one of the satellites to a particular region on the earth is substantially 24 hours for a specific satellite path orientation.

8. The constellation of satellites as set forth in claim 7, wherein for equally spaced N satellites along the ground track, said revisit time is 24/N.

9. The constellation of satellites as set forth in claim 1, wherein altitudes below 35,876 km may be selected from the group consisting of the fifteen unique locations for either inclination as dictated by the following table:

| Earth Model Inclination No. of Distinctive Tracks Before repeat occurs | Oblate Spheroid 48.8 deg | Oblate Spheroid 28.5 deg |
|---|---|---|
| 1 | 20182.65 | 20184.16 |
| 2 | 13889.58 | 13891.08 |
| 3 | 10349.71 | 10350.96 |
| 4 | 8033.98 | 8034.752 |
| 5 | 6380.30 | 6380.418 |
| 6 | 5129.45 | 5128.732 |
| 7 | 4143.88 | 4142.162 |
| 8 | 3343.26 | 3340.393 |
| 9 | 2677.28 | 2673.109 |
| 10 | 2112.67 | 2107.049 |
| 11 | 1626.49 | 1619.266 |
| 12 | 1202.35 | 1193.378 |
| 13 | 828.21 | 817.3412 |
| 14 | 495.01 | 482.0905 |
| 15 | 195.79 | 180.6563. |

10. The constellation of satellites as set forth in claim 1, further comprising change detection means for obtaining detection images for at least a particular region on the earth.

11. The constellation of satellites as set forth in claim 10, wherein said N satellites are capable of transferring the task of imaging at a given ground region from one satellite to the nearest neighbor along the ground track.

12. A method for designing constellations, comprising:

providing a constellation of satellites having repeating common ground tracks, by configuring N satellites in a constellation, where N is a integer ≧2, said N satellites being located in N orbital planes which are arbitrarily spaced around the earth;

establishing a minimal number of distinctive ground traces represented by k, all of said N satellites tracing common ground tracks which repeat at k+1 orbits, wherein k is a function of an altitude and an inclination of the N satellites, whereby for particular combinations of altitudes and inclinations a daily repeating common ground track is realized, and adjusting a $RAAN_N$ and a phasing$_N$ for said N satellites by multiples of 2π radians so as to have a ground track that is substantially overlapping the previous satellite's ground track.

13. The method as set forth in claim 12, wherein providing the constellation includes allowing k to represent both an integer and a non-integer.

14. The method as set forth in claim 12, wherein providing the constellation includes station-keeping to account for any drifting of the satellites.

15. The method as set forth in claim 12, wherein providing the constellation includes launching the satellites from one or several launch vehicles.

16. The method as set forth in claim 12, wherein providing the constellation includes sharing a common inclination among said N orbital planes.

17. The method as set forth in claim 16, wherein sharing a common inclination includes setting any arbitrary number within an acceptable range for the inclination.

18. The method as set forth in claim 12, further comprising gathering change detection images from subsequent satellites in the constellation.

19. The method as set forth in claim 18, wherein providing the constellation includes obtaining change detection images for at least a particular region on the earth.

20. The method as set forth in claim 12, wherein providing the constellation includes satisfying the following expression for said k:

$$k = \frac{k_0 \dot{L} + \dot{\omega} + \dot{M}}{\dot{L} - \dot{\Omega}}$$

where
  $\dot{L}$=Earth Rotation Rate
  $\dot{\omega}$=Rate of Change of Perigee
  $\dot{M}$=Rate of Change of the Mean Anomaly
  $\dot{\Omega}$=Rate of Change of the Ascending Node
  $k_0 = 1/\omega_e (\mu/a^3)^{0.5}$ where
  $\mu$=Kepler's gravitational constant=$3.986 \times 10^5$ km$^3$/s$^2$
  $\omega_e$=Earth's rotation rate=$7.292 \times 10^{-5}$ rad/s and
  a=radius of satellite in km.

21. The method as set forth in claim 12, wherein providing the constellation includes establishing a revisit time for any one of the N satellites to a particular region on the earth of substantially 24 hours.

22. The method as set forth in claim 21, wherein providing the constellation includes establishing a revisit time of 24/N for equally spaced N satellites along the ground track.

23. The method as set forth in claim 21, wherein providing the constellation includes providing, for altitudes below 35,876 km, any of fifteen unique altitudes selected from the group, for either inclination, as dictated by the following table:

| Earth Model Inclination No. of Distinctive Tracks Before repeat occurs | Oblate Spheroid 48.8 deg | Oblate Spheroid 28.5 deg |
|---|---|---|
| 1 | 20182.65 | 20184.16 |
| 2 | 13889.58 | 13891.08 |
| 3 | 10349.71 | 10350.96 |
| 4 | 8033.98 | 8034.752 |
| 5 | 6380.30 | 6380.418 |
| 6 | 5129.45 | 5128.732 |
| 7 | 4143.88 | 4142.162 |
| 8 | 3343.26 | 3340.393 |
| 9 | 2677.28 | 2673.109 |
| 10 | 2112.67 | 2107.049 |
| 11 | 1626.49 | 1619.266 |
| 12 | 1202.35 | 1193.378 |
| 13 | 828.21 | 817.3412 |
| 14 | 495.01 | 482.0905 |
| 15 | 195.79 | 180.6563. |

24. The method as set forth in claim 12, wherein providing the constellation includes transferring the task of imaging a given ground region from one satellite to the nearest neighbor satellite along the ground track.

25. A constellation of sun-synchronous satellites having a repeating common ground track for providing change detection, comprising:
  N satellites configured in a constellation, where N is a integer $\geq 2$, said N satellites being located in N orbital planes, orbits of the N satellites follow a common ground track and remain in close proximity to the terminator of the earth throughout successive orbits, wherein an appropriate altitude, inclination and right ascension of the ascending node (RAAN) are selected so as to precisely match up the orbiting N satellites with the earth's rotation relative to the sun, wherein the RAAN is maintained in a terminator regions,
  wherein the combination of altitude and inclination of the N satellites is selected from the group consisting of the following table:

| Indep Grd Tracks | Altitude km | Inclination degrees |
|---|---|---|
| 7 | 5171.037 | 142.209 |
| 8 | 4183.531 | 125.307 |
| 9 | 3383.598 | 116.022 |
| 10 | 2719.860 | 110.53 |
| 11 | 2158.554 | 105.925 |
| 12 | 1676.479 | 102.936 |
| 13 | 1257.107 | 100.700 |
| 14 | 888.314 | 98.982 |
| 15 | 560.986 | 97.635 |
| 16 | 268.125 | 96.560 |
| 17 | 4.264 | 95.690. |

26. The constellation of satellites as set forth in claim 25, wherein an extreme angle (+/−) that the N orbital planes can make with respect to the terminator region and still have the N satellites in the sunlight is in the range of 2.09 degrees to 56.48 degrees depending on the altitude and inclination selected.

27. A method for designing constellations, comprising:
  providing a constellation of sun-synchronous satellites having repeating common ground tracks, by
  configuring N satellites in a constellation, where N is a integer $\geq 2$, said N satellites being located in N orbital planes;
  establishing orbits of the N satellites that follow a common ground track and remain in close proximity to the terminator of the earth throughout successive orbits;
  selecting an appropriate altitude, inclination and right ascension of the ascending node (RAAN) so as to precisely match up the orbiting N satellites with the earth's rotation relative to the sun, wherein the RAAN is maintained in a terminator region,
  wherein providing the constellation includes selecting a combination of altitude and inclination for the N satellites from a group consisting of the following table:

| Indep Grd Tracks | Altitude km | Inclination degrees |
|---|---|---|
| 7 | 5171.037 | 142.209 |
| 8 | 4183.531 | 125.307 |
| 9 | 3383.598 | 116.022 |
| 10 | 2719.860 | 110.53 |
| 11 | 2158.554 | 105.925 |
| 12 | 1676.479 | 102.936 |
| 13 | 1257.107 | 100.700 |
| 14 | 888.314 | 98.982 |
| 15 | 560.986 | 97.635 |
| 16 | 268.125 | 96.560 |
| 17 | 4.264 | 95.690. |

28. The method as set forth in claim 27, wherein the providing the constellation includes selecting an extreme angle (+/−) that the N orbital planes can make with respect to the terminator region and still have the N satellites in the sunlight within the range of 2.09 degrees to 56.48 degrees depending on the altitude and inclination selected.

* * * * *